(12) United States Patent
Luther

(10) Patent No.: US 8,067,088 B2
(45) Date of Patent: *Nov. 29, 2011

(54) PELLETIZED BROMINATED ANIONIC STYRENIC POLYMERS AND THEIR PREPARATION AND USE

(75) Inventor: Douglas W. Luther, Walker, LA (US)

(73) Assignee: Albemarle Corporation, Richmond, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/537,965

(22) Filed: Aug. 7, 2009

(65) Prior Publication Data

US 2009/0299012 A1    Dec. 3, 2009

Related U.S. Application Data

(62) Division of application No. 11/569,070, filed on Nov. 14, 2006, now Pat. No. 7,585,443.

(51) Int. Cl.
*C08F 8/20* (2006.01)
*C08J 3/12* (2006.01)

(52) U.S. Cl. ........... 428/402; 525/333.3; 525/333.4; 525/356; 526/293

(58) Field of Classification Search .......... 264/141–143; 428/402; 526/293; 525/333.3, 333.4, 356

See application file for complete search history.

(56) References Cited

U.S. PATENT DOCUMENTS

| | | |
|---|---|---|
| 685,682 A | 10/1901 | Hunt |
| 909,001 A | 1/1909 | Kronenberg |
| 3,094,498 A | 6/1963 | Landolt |
| 3,372,880 A | 3/1968 | O'Hara |
| 3,549,564 A | 12/1970 | Parker et al. |
| 3,660,321 A | 5/1972 | Praetzel et al. |
| 3,812,088 A | 5/1974 | Bennett |
| 3,839,140 A | 10/1974 | Tyler et al. |
| 3,852,401 A | 12/1974 | Suzuki et al. |
| 4,138,356 A | 2/1979 | Vincent et al. |
| 4,440,880 A | 4/1984 | Albanesi et al. |

(Continued)

FOREIGN PATENT DOCUMENTS

CA    2211214 A1    11/1998

(Continued)

OTHER PUBLICATIONS

Pyro-Chek 68PB Flame Retardant Product Data Sheet. Albemarle Corporation. May 2001. 2 pages.*

(Continued)

*Primary Examiner* — Milton I Cano
*Assistant Examiner* — Brieann R Fink
(74) *Attorney, Agent, or Firm* — Jeremy J. Kliebert

(57) ABSTRACT

Despite the frangibility of additive-free granules of brominated anionic styrenic polymer, pellets of unadulterated brominated anionic styrenic polymer are provided having 50 wt % or more bromine content, in which 70 wt % or more of the pellets are retained on a US No. 40 sieve and no more than 30 wt % are retained on a US No. 5 sieve. These pellets contain no binding agent and they do not break apart or revert to small particles and finely divided powder, typically called "fines" when subjected to ordinary handling. More specifically, no more than about 5 wt %, preferably no more than about 3 wt %, and more preferably no more than about 1 wt % of these pellets as formed and packaged are fines or dusts that can pass through a US No. 40 sieve.

17 Claims, 2 Drawing Sheets

U.S. PATENT DOCUMENTS

| | | | |
|---|---|---|---|
| 4,442,273 A | 4/1984 | Neiditch et al. |
| 4,486,468 A | 12/1984 | Gray |
| 4,504,603 A | 3/1985 | Hicks |
| 4,530,880 A | 7/1985 | Taniuchi et al. |
| 4,532,112 A | 7/1985 | Nakahira et al. |
| 4,584,149 A | 4/1986 | Alfonso et al. |
| 4,612,239 A | 9/1986 | Dimanshteyn |
| 4,707,355 A | 11/1987 | Wilson |
| 4,755,397 A | 7/1988 | Eden et al. |
| 4,772,642 A | 9/1988 | Staendeke |
| 4,785,031 A | 11/1988 | Scarso |
| 4,812,445 A | 3/1989 | Eden et al. |
| 4,871,477 A | 10/1989 | Dimanshteyn |
| 4,883,846 A | 11/1989 | Moore et al. |
| 4,892,925 A | 1/1990 | Wang et al. |
| 4,923,753 A | 5/1990 | Walles et al. |
| 4,961,989 A | 10/1990 | Grimwood |
| 5,391,655 A | 2/1995 | Brandstetter et al. |
| 5,413,861 A | 5/1995 | Gallo |
| 5,430,126 A | 7/1995 | Mukai |
| 5,476,716 A | 12/1995 | Gallo |
| 5,543,447 A | 8/1996 | Miller et al. |
| 5,637,650 A | 6/1997 | Gill et al. |
| 5,660,769 A | 8/1997 | Sagar et al. |
| 5,677,390 A | 10/1997 | Dadgar et al. |
| 5,686,538 A | 11/1997 | Balhoff et al. |
| 5,717,040 A | 2/1998 | Brandstetter et al. |
| 5,723,549 A | 3/1998 | Dever et al. |
| 5,726,252 A | 3/1998 | Gill et al. |
| 5,739,187 A | 4/1998 | Asano et al. |
| 5,767,203 A | 6/1998 | Ao et al. |
| 5,804,654 A | 9/1998 | Lo et al. |
| 5,852,131 A | 12/1998 | Balhoff et al. |
| 5,852,132 A | 12/1998 | Dadgar et al. |
| 5,869,553 A | 2/1999 | Ueda |
| 5,902,865 A | 5/1999 | Gausepohl et al. |
| 5,916,978 A | 6/1999 | Ao et al. |
| 5,919,844 A | 7/1999 | Shimizu et al. |
| 6,091,157 A | 7/2000 | Black et al. |
| 6,133,381 A | 10/2000 | Reed et al. |
| 6,190,581 B1 | 2/2001 | Duffin, Jr. et al. |
| 6,190,787 B1 | 2/2001 | Maeda et al. |
| 6,207,765 B1 | 3/2001 | Ao et al. |
| 6,216,404 B1 | 4/2001 | Vellrath |
| 6,232,393 B1 | 5/2001 | Dadgar et al. |
| 6,232,408 B1 | 5/2001 | Dadgar et al. |
| 6,235,831 B1 | 5/2001 | Reed et al. |
| 6,235,844 B1 | 5/2001 | Dadgar et al. |
| 6,355,194 B1 | 3/2002 | Agur et al. |
| 6,479,569 B2 | 11/2002 | Jung et al. |
| 6,513,602 B1 | 2/2003 | Lewis et al. |
| 6,518,332 B2 | 2/2003 | Asano et al. |
| 6,521,714 B2 | 2/2003 | Kolich et al. |
| 6,576,690 B1 | 6/2003 | Hwang et al. |
| 6,630,745 B1 | 10/2003 | Osada et al. |
| 6,657,028 B1 | 12/2003 | Aplin et al. |
| 6,979,717 B2 | 12/2005 | Moore |
| 6,992,148 B2 | 1/2006 | Manimaran et al. |
| 7,202,296 B2 | 4/2007 | Muylem et al. |
| 7,405,254 B2 | 7/2008 | Muylem et al. |
| 7,446,153 B2 | 11/2008 | Kolich et al. |
| 7,585,443 B2 * | 9/2009 | Luther ............ 525/356 |
| 7,632,893 B2 | 12/2009 | Kolich et al. |
| 7,638,583 B2 | 12/2009 | Kolich et al. |
| 7,666,943 B2 | 2/2010 | Reed et al. |
| 7,666,944 B2 | 2/2010 | De Schryver et al. |
| 2001/0021742 A1 * | 9/2001 | Finberg et al. ............ 524/467 |
| 2002/0046522 A1 | 4/2002 | Kilduff et al. |
| 2002/0061983 A1 | 5/2002 | Kolich et al. |
| 2002/0188048 A1 | 12/2002 | Wagner et al. |
| 2002/0188049 A1 | 12/2002 | Peerlings et al. |
| 2003/0050399 A1 | 3/2003 | Kimura et al. |
| 2003/0068504 A1 | 4/2003 | Joseph |
| 2004/0072929 A1 * | 4/2004 | De Schryver ............ 524/86 |
| 2005/0159552 A1 | 7/2005 | Reed et al. |
| 2005/0222300 A1 | 10/2005 | Ikezawa et al. |
| 2008/0164445 A1 | 7/2008 | Lin et al. |
| 2008/0167427 A1 | 7/2008 | Lin et al. |
| 2009/0233097 A1 | 9/2009 | Kolich et al. |
| 2009/0264599 A1 | 10/2009 | Balhoff et al. |
| 2010/0047577 A1 | 2/2010 | Luther et al. |

FOREIGN PATENT DOCUMENTS

| | | |
|---|---|---|
| CN | 1342739 | 4/2002 |
| DE | 2113470 | 9/1972 |
| DE | 2226641 A1 | 12/1973 |
| DE | 2233544 A1 | 1/1974 |
| DE | 2244736 A1 | 3/1974 |
| DE | 2646835 A1 | 4/1978 |
| DE | 3317197 C1 | 10/1984 |
| DE | 4241961 A1 | 6/1993 |
| DE | 10064920 A1 | 7/2002 |
| DE | 10158490 A1 | 6/2003 |
| EP | 0002514 B1 | 6/1979 |
| EP | 0180790 A1 | 5/1986 |
| EP | 0342685 A1 | 11/1989 |
| EP | 0492139 A1 | 7/1992 |
| EP | 0720901 A1 | 7/1996 |
| EP | 0735011 A1 | 10/1996 |
| EP | 1191062 A1 | 3/2002 |
| EP | 1288260 A1 * | 3/2003 |
| GB | 1577587 | 10/1980 |
| GB | 2181093 A | 4/1987 |
| GB | 2210377 A | 7/1989 |
| JP | 47036235 B4 | 9/1972 |
| JP | 48012470 B4 | 4/1973 |
| JP | 48035694 B4 | 10/1973 |
| JP | 49048073 B4 | 12/1974 |
| JP | 50-109237 A | 8/1975 |
| JP | 52008346 B4 | 3/1977 |
| JP | 53096038 | 8/1978 |
| JP | 57050899 | 3/1982 |
| JP | 57192574 A2 | 11/1982 |
| JP | 57193646 A2 | 11/1982 |
| JP | 58009317 A2 | 1/1983 |
| JP | 58132056 | 8/1983 |
| JP | 60032837 | 2/1985 |
| JP | 60160112 A2 | 8/1985 |
| JP | 61115942 | 6/1986 |
| JP | 62112639 | 5/1987 |
| JP | 62263247 | 11/1987 |
| JP | 63225640 | 9/1988 |
| JP | 2160849 | 6/1990 |
| JP | 2216299 | 8/1990 |
| JP | 2258849 | 10/1990 |
| JP | 3026730 | 2/1991 |
| JP | 3095270 | 4/1991 |
| JP | 4082571 | 3/1992 |
| JP | 4141184 | 5/1992 |
| JP | 4249550 | 9/1992 |
| JP | 5009376 | 1/1993 |
| JP | 5194786 | 8/1993 |
| JP | 5195443 | 8/1993 |
| JP | 5247264 | 9/1993 |
| JP | 6313099 | 11/1994 |
| JP | 8060600 | 3/1996 |
| JP | 8217953 | 8/1996 |
| JP | 9040867 | 2/1997 |
| JP | 9067467 | 3/1997 |
| JP | 11019246 | 1/1999 |
| JP | 11029773 | 2/1999 |
| JP | 11255955 | 9/1999 |
| JP | 2000143962 | 5/2000 |
| JP | 2000273223 | 10/2000 |
| JP | 2000273238 | 10/2000 |
| JP | 2000357765 | 12/2000 |
| JP | 2001152033 | 6/2001 |
| JP | 2001192434 | 7/2001 |
| JP | 2001240751 | 9/2001 |
| JP | 2002060611 | 2/2002 |
| JP | 2002356539 | 12/2002 |
| JP | 2003034714 | 2/2003 |
| JP | 2003171534 | 6/2003 |
| JP | 2003212966 | 7/2003 |
| KR | 9500217 B1 | 1/1995 |
| NL | 8603023 | 6/1988 |
| RU | 2099384 C1 | 12/1997 |

| | | |
|---|---|---|
| SU | 1520076 A1 | 11/1989 |
| WO | WO-8700187 A1 | 1/1987 |
| WO | WO 97/47663 A1 | 12/1997 |
| WO | WO 98/13395 A1 | 4/1998 |
| WO | WO 98/13396 A1 | 4/1998 |
| WO | WO 98/13397 A1 | 4/1998 |
| WO | WO 98/50439 A1 | 11/1998 |
| WO | WO 99/25746 A1 | 5/1999 |
| WO | WO 99/55770 A1 | 11/1999 |
| WO | WO-9956830 A1 | 11/1999 |
| WO | WO 00/14125 A1 | 3/2000 |
| WO | WO-00/14152 A1 | 3/2000 |
| WO | WO 00/14158 A1 | 3/2000 |
| WO | WO-00/23494 A1 | 4/2000 |
| WO | WO-01/44137 A1 | 6/2001 |
| WO | WO-02/28986 A1 | 4/2002 |
| WO | WO 02/72645 A2 | 9/2002 |
| WO | WO-02/096519 A1 | 12/2002 |
| WO | WO-03/080726 A1 | 10/2003 |
| WO | WO 2005/063869 A1 | 7/2005 |
| WO | WO 2005/068513 A1 | 7/2005 |
| WO | WO 2005/095685 A1 | 10/2005 |
| WO | WO 2005/118245 A1 | 12/2005 |
| WO | WO 2006/019414 A1 | 2/2006 |
| WO | WO 2007/005233 A1 | 1/2007 |
| WO | WO 2007/076355 A1 | 7/2007 |
| WO | WO 2007/076369 A1 | 7/2007 |
| WO | WO 2008/011477 A2 | 1/2008 |
| WO | WO 2008/024824 A1 | 2/2008 |
| WO | WO 2008/066970 A1 | 6/2008 |
| WO | WO 2008/086359 A2 | 7/2008 |
| WO | WO 2008/086362 A1 | 7/2008 |
| WO | WO 2009/058966 A1 | 5/2009 |

OTHER PUBLICATIONS

Saytex HP-3010 Flame Retardant Product Data Sheet. Albemarle Corporation. Jul. 2003. 1 page.*
Saytex HP-7010P/7010G Flame Retardant Product Data Sheet. Albemarle Corporation. Apr. 2003. 1 page.*
Definition: granule. Hawley's Condensed Chemical Dictionary, 14th Edition. John Wiley & Sons, Inc. 2002.*
Table 21-6 U.S. Sieve Series and Tyler Equivalents (ASTM-E-11-61); 1 page.*
Albemarle Corporation (New SAYTEX HP-3010 Flame Retardant Improves Processability of FR Resins for Complex, Thin-Walled Parts, May 2003, 2 pages).*
Gami (Conference Proceedings at ANTEC '98: Value-Added Impact of Fines Separation From Free-Falling Dry Thermoplastic Regrind. Apr. 1998, pp. 2946-2950).*
Perry R.H. and Green D.W., "Perry's Chemical Engineers' Handbook", Table 21-6 U.S. Sieve Series and Tyler Equivalents (ASTM-E-11-61), circa 1984, 1 page.*
CAPLUS Abstract of Antonov et al., "Effect of Phosphorus-Containing Fire-Retardant Systems on Fireproofing and Processing Indexes of Polypropylene", Fibre Chemistry (Translation of Khimicheskie Volokna), 2002, pp. 412-417, vol. 34(6), Kluwer Academic/Consultants Bureau. Accession No. 2003:226272 CAPLUS.
CAPLUS Abstract of Antonov et al., "Microencapsulated Fire Retardants in Polymers", Special Publication—Royal Society of Chemistry, 1998, pp. 290-303, vol. 224. Accession No. 1998:575772 CAPLUS.
CAPLUS Abstract of Axelbaum et al., "A Flame Process for Synthesis of Unagglomerated, Low-Oxygen Nanoparticles: Application to Ti and TiB2", Metallurgical and Materials Transactions B: Process Metallurgy and Materials Processing Science, 1997, pp. 1199-1211, vol. 28B(6). Accession No. 1998:77500 CAPLUS.
CAPLUS Abstract of Axelbaum et al., "Gas-Phase Combustion Synthesis of Metal and Ceramic Nanoparticles", NASA Conference Publication (1997), 10194 (Fourth International Microgravity Combustion Workshop), 1997, pp. 37-42. Accession No. 1998:30253 CAPLUS.
CAPLUS Abstract of Axelbaum et al., "Gas-Phase Combustion Synthesis of Nonoxide Nanoparticles in Microgravity", NASA Conference Publication (2001), (NASA/CO-2001-210826, Sixth International Microgravity Combustion Workshop), 2001, pp. 297-300. Accession No. 2002:825180 CAPLUS.
CAPLUS Abstract of Axelbaum, "Synthesis of Stable Metal and Non-Oxide Ceramic Nanoparticles in Sodium/Halide Flames", Powder Metallurgy, 2000, pp. 323-325, vol. 43(4). Accession No. 2001:77243 CAPLUS.
CAPLUS Abstract of Black et al., "Chemiluminescence Photon Yields for Some Encapsulated Metal System Flames", Journal of Chemical Physics, 1974, pp. 3709-3710, vol. 60(9). Accession No. 1974:431492 CAPLUS.
CAPLUS Abstract of Brown, "Next Generation Fire Suppressants", NASA Conference Publication (1995), 3298 (Aerospace Environmental Technology Conference), 1994, pp. 239-243. Accession No. 1996:275194 CAPLUS.
CAPLUS Abstract of Brown, "Development of Test Methods for Assessing Encapsulants for Friable Asbestos Insulation Products", Journal of Coatings Technology, 1990, pp. 35-40, vol. 62(782). Accession No. 1990:517118 CAPLUS.
CAPLUS Abstract of Cao et al., "Fabrication and Applications of Micro-encapsulated Red Phosphorus for Flame Retardant", Hebei Gongxueyuan Xuebao, 1995, pp. 96-102, vol. 24(4). Accession No. 1996:468228 CAPLUS.
CAPLUS Abstract of Chu et al., "Fire Induced Response in Foam Encapsulants", International SAMPE Symposium and Exhibition, 44 (Evolving and Revolutionary Technologies for the New Millenium, Book 1), 1999, pp. 1179-1193. Accession No. 1999:655688 CAPLUS.
CAPLUS Abstract of Chyko, "Urethane Encapsulants for Switchgear Transformers", Proceedings of the Electrical/Electronics Insulation Conference, 1983, pp. 12-17, $16^{th}$. Accession No. 1984:193609 CAPLUS.
CAPLUS Abstract of Copeland et al., "Study of Flame Inhibition and Vapor Release by Microencapsulated Fire Retardant Compounds", Sci. Tech. Aerosp. Rep., 1969, p. 4687, vol. 7(24). Accession No. 1970:405601 CAPLUS.
CAPLUS Abstract of Dufaux et al., "Nanoscale Unagglomerated Nonoxide Particles From a Sodium Coflow Flame", Combustion and Flame, 1995, pp. 350-358, vol. 100(3). Accession No. 1995:450634 CAPLUS.
CAPLUS Abstract of Eckstrom et al., "New Chemical Laser Systems", Govt. Rep. Annouonce. (U.S.), 1974, p. 224, vol. 74(6). Accession No. 1974:408210 CAPLUS.
CAPLUS Abstract of Galica et al., "Results to Date—Development of New EVA-Based Encapsulants, Faster-Curing and Flame-Retardant Types", Conference Record of the IEEE Photovoltaic Specialists Conference, 2000, pp. 30-35, $28^{th}$. Accession No. 2001:381619 CAPLUS.
CAPLUS Abstract of Gallo, "Effect of Mold Compound Components on Moisture -Induced Degradation of Gold-Aluminum Bonds in Epoxy Encapsulated Devices", Annual Proceedings-Reliability Physics [Symposium], 1990, pp. 244-251,28th. Accession No. 1990:622751 CAPLUS.
CAPLUS Abstract of Ge et al., "Investigation of Flame Retardant Effects of Micro-Encapsulated Red Phosphorus on Rubbers", Proc. Beijing Int. Symp./Exhib. Flame Retard., $2^{nd}$, 1993, pp. 345-356. Accession No. 1994:437374 CAPLUS.
CAPLUS Abstract of Giraud et al., "Flame Behavior of Cotton Coated with Polyurethane Containing Microencapsulated Flame Retardant Agent", Journal of Industrial Textiles, 2001, pp. 11-26, vol. 31(1). Accession No. 2002:24883 CAPLUS.
CAPLUS Abstract of Giraud et al., "Microencapsulation of Phosphate: Application to Flame Retarded Coated Cotton", Polymer Degradation and Stability, 2002, pp. 285-297, vol. 77(2). Accession No. 2002:532422 CAPLUS.
CAPLUS Abstract of Gozalishvili et al., "Thermally Dispersible Inorganic Materials with Increased Inhibitory Capacity", Soobshcheniya Akademii Nauk Gruzinskoi SSR, 1987, pp. 337-340, vol. 126(2). Accession No. 1987:557781 CAPLUS.
CAPLUS Abstract of Gyorgy et al., "Fire Resistance of Polyolefins. III. Effect of Elastomer Additives on Fire-Resistant Polypropylene (PP) Systems", Muanyag es Gumi, 1997, pp. 265-268, vol. 34(9). Accession No. 1997:627072 CAPLUS.

CAPLUS Abstract of Heine et al., "Burnjector-High Efficiency Coaxial Super Sonic Injector", Electronic Furnace Conference Proceedings, 2002, pp. 81-92, 60th. Accession No. 2003:31207 CAPLUS.

CAPLUS Abstract of Kibenko et al., "Phosphorus Containing Flame Retardant Systems in Capsules and Their Using in Thermoplastics", Proc. Beijing Int. Symp./Exhib. Flame Retard., 1993, pp. 33-37, 2nd. Accession No. 1994:458709 CAPLUS.

CAPLUS Abstract of Kim et al., "Thermal Stabilities and Mechanical Properties of Epoxy Molding Compounds (EMC) Containing Encapsulated Red Phosphorus", Polymer Degradation and Stability, 2003, pp. 207-213, vol. 81(2). Accession No. 2003:483102 CAPLUS.

CAPLUS Abstract of Kovar et al., "Microencapsulated Fire Retardants for Flame -Resistant Tentage Textiles", Recent Advances in Flame Retardancy of Polymeric Materials, 1997, pp. 88-97, vol. 8. Accession No. 1998:362606 CAPLUS.

CAPLUS Abstract of Lu et al., "Improvement of Heat Stability of Flame Retardant SBC by Microencapsulation", Suliao Gongye, 1998, pp. 125-127, vol. 26(3). Accession No. 1998:718317 CAPLUS.

CAPLUS Abstract of Lu et al.. "Microencapsulated TBC and Its Applications", Suliao Gongye, 1999, pp. 43-44, vol. 27(1). Accession No. 1999:279978 CAPLUS.

CAPLUS Abstract of Lu et al., "Techno-Economic Evaluation of Micro-Encapsulated Flame Retardant Chlorowax-70", Xiandai Huagong, 1999, pp. 32-33, vol. 19(9). Accession No. 1999:666290 CAPLUS.

CAPLUS Abstract of Lum et al., "Investigation of the Molecular Processes Controlling Corrosion Failure Mechanisms in Plastic Encapsulated Semiconductor Devices", Proceedings-Electronic Components Conference, 1980, pp. 113-120, 30th. Accession No. 1980:578214 CAPLUS.

CAPLUS Abstract of Lum et al., "Investigation of the Molecular Processes Controlling Corrosion Failure Mechanisms in Plastic Encapsulated Semiconductor Devices", Microelectronics and Reliability, 1981, pp. 15-31, vol. 21(1). Accession No. 1981:434202 CAPLUS.

CAPLUS Abstract of Lum et al., "Thermal Degradation of Polymers for Molded Integrated Circuit (IC) Devices. The Effect of a Flame Retardant", ACS Symposium Series (1982), 184 (Polym. Mater. Electron. Appl.), pp. 213-232. Accession No. 1982:191406 CAPLUS.

CAPLUS Abstract of Maeng et al., "Synthesis and Process Development of Ultrafine Ti Powder by Sodium Flame Encapsulation Method", Han'guk Chaelyo Hakhoechi, 2002, pp. 391-397, vol. 12(5). Accession No. 2002:536655 CAPLUS.

CAPLUS Abstract of Manalac et al., "Environmentally Safe Molding Compound", Advanced Packaging, 2001, pp. 31-32, 34, 36, vol. 10(11). Accession No. 2002:471086 CAPLUS..

CAPLUS Abstract of Markin et al., "Control of the Imported Fire Ants with Winter Applications of Microencapsulated Mirex Bait", Journal of Economic Entomology, 1975, pp. 711-712, vol. 68(5). Accession No. 1976:1200 CAPLUS.

CAPLUS Abstract of Marosi et al., "Silicon Interphases in Intumescent Flame-Retarded Polypropylenes", Recent Advances in Flame Retardancy of Polymeric Materials, 1998, pp. 81-89, vol. 9. Accession No. 1999:258439 CAPLUS.

CAPLUS Abstract of McGee et al., "A Study of the Effects of a Micelle Encapsulator Fire Suppression Agent on Dynamic Headspace Analysis of Fire Debris Samples", Journal of Forensic Sciences, 2002, pp. 267-274, vol. 47(2). Accession No. 2002:245882 CAPLUS.

CAPLUS Abstract of Mirick et al., "Evaluation of Encapsulants for Sprayed-On Asbestos-Containing Materials in Buildings", Gov. Rep. Announce. Index (U.S.) 1988, vol. 88(5), Abstr. No. 812,119. Accession No. 1988:460600 CAPLUS.

CAPLUS Abstract of Mirick et al., "Evaluation of Encapsulants for Sprayed-On Asbestos-Containing Materials in Buildings", Gov. Rep. Announce. Index (U.S.) 1988, vol. 88(4), Abstr. No. 809,778. Accession No. 1988:411038 CAPLUS.

CAPLUS Abstract of Ohuchi et al., "Improvement of the Fire-Proofing and Fire-Resistance Properties of PV Modules for Building's Exterior Walls", Conference Record of the IEEE Photovoltaic Specialists Conference, 2000, pp. 1533-1538, 28th. Accession No. 2001:381932 CAPLUS.

CAPLUS Abstract of Okada et al., "Determination of Uranium and Thorium in Semiconductor Materials by Tungsten -Boat Vaporization/Inductively Coupled Plasma-Atomic Emission Spectrometry", Bunseki Kagaku, 1988, pp. T205-T208, vol. 37(11). Accession No. 1989:87611 CAPLUS.

CAPLUS Abstract of Piskarev et al., "Rubber Compositions with Low Fire Danger", Plasticheskie Massy, 1988, pp. 32-34, vol. 9. Accession No. 1999:111932 CAPLUS.

CAPLUS Abstract of Popov et al., "Ignitability of Dispersed Alloys of Aluminum and Magnesium with Lithium", Fizika Aerodispersnykh Sistem, 1986, pp. 12-17, vol. 30. Accession No. 1989:100000 CAPLUS.

CAPLUS Abstract of Popova et al., "Effect of Polymer Matrix on the Efficiency of Microencapsulated Flame Retardants", Polym. Compos., Proc., Microsymp. Macromol., 1986, pp. 311-321, 28th. Accession No. 1986:573663 CAPLUS.

CAPLUS Abstract of Raff et al., "Water-Resistant Flame Retardants for Preventing Forest Fires", Fire Technology, 1967, pp. 33-37, vol. 3(1). Accession No. 1967:422524 CAPLUS.

CAPLUS Abstract of Rauhut, "Advanced Epoxy Molding Compounds for Semiconductor Encapsulation", Technical Papers-Society of Plastics Engineers, 1976, pp. 313-316, vol. 22. Accession No. 1976:447427 CAPLUS.

CAPLUS Abstract of Reshetnikov et al., "Microencapsulated Fire Retardants for Polyolefins", Materials Chemistry and Physics, 1998, pp. 78-82, vol. 52(1). Accession No. 1998:49000 CAPLUS.

CAPLUS Abstract of Rudakova et al., "Studies of a Flame Propagation Over Surfaces of Thin Polymer Films Containing a Micro-Encapsulated Fire Retardant", Journal of the Balkan Tribological Association, 2002, pp. 81-84, vol. 8(1-2). Accession No. 2002:662353 CAPLUS.

CAPLUS Abstract of Shu et al., "Recent Research Progress of Microencapsulated Phosphorus Flame Retardants", Zhongguo Suliao, 2002, pp. 12-14, vol. 16(1). Accession No. 2002:287349 CAPLUS.

CAPLUS Abstract of Sun et al., "A Multicomponent Sectional Model Applied to Flame Synthesis of Nanoparticles", Proceedings of the Combustion Institute, 2002, pp. 1063-1069, vol. 29(Pt. 1). Accession No. 2003:430567 CAPLUS.

CAPLUS Abstract of Sun et al.,"Monte Carlo Simulation of Nanoparticle Encapsulation in Flames", NASA Conference Publication (1999), 208917 (Fifth International Microgravity Combustion Workshop), 1999, pp. 141-144. Accession No. 2000:63932 CAPLUS.

CAPLUS Abstract of Torrisi et al., "ESCA and SIMS Study of the Tetrabromobisphenol-A Flame Retardant Diffusion to the Metal-Encapsulating Resin Interface", Materials Research Society Symposium Proceedings, 1988, pp. 365-370, vol. 108(Electron. Packag. Mater. Sci. 3). Accession No. 1988:591396 CAPLUS.

CAPLUS Abstract of Vander Meer et al., "Controlled Release Formulations and Control of the Imported Fire Ant: What Are the Possibilities?", Controlled Release Bioact. Mater., [Symp. Int. Meet. Controlled Release Soc.], 1980, pp. 251-266, 6th. Accession No. 1981:78367 CAPLUS.

CAPLUS Abstract of Wang et al., "Phosphorus-Containing Epoxy Resin for an Electronic Application", Journal of Applied Polymer Science, 1999, pp. 353-361, vol. 73(3). Accession No. 1999:346916 CAPLUS.

CAPLUS Abstract of Wang et al., "Synthesis and Properties of Epoxy Resins Containing Bis(3-Hydroxyphenyl) Phenyl Phosphate", European Polymer Journal, 2000, pp. 443-452, vol. 36(3). Accession No. 2000:82409 CAPLUS.

CAPLUS Abstract of Yu et al., "Study on Flame Retarding Technique and Application of Epoxy Encapsulating Material for Film Capacitor", Reguxing Shuzhi, 1999, pp. 34-36, vol. 14(4). Accession No. 2000:189098 CAPLUS.

CAPLUS Abstract of Zhartovskii, "Methods of Controlling the Permeability of Shells of Microcapsules of Fire-Extinguishing Compositions", Ognetushashchie Poroshk. Sredstva, 1982, pp. 90-96. Accession No. 1984:409602 CAPLUS.

CAPLUS Abstract of Zubkova, "A Highly Effective Domestic Fire Retardant for Fireproofing Fibrous Textile Materials", Fibre Chemistry (Translation of Khimicheskie Volokna), 1997, pp. 126-129, vol. 29(2). Accession No. 1997:791668 CAPLUS.

CAPLUS Abstract of Zubkova et al., "Decreasing the Combustibility of Polyolefins Using Microencapsulated Fire Retardants", Fibre Chemistry (Translation of Khimicheskie Volokna), 1998, pp. 166-168, vol. 29(3). Accession No. 1998:51091 CAPLUS.

CAPLUS Abstract of Zubkova et al., "Rheological and Fireproofing Characteristics of Polyethylene Modified with a Microencapsulated Fire Retardant", Fibre Chemistry (Translation of Khimicheskie Volokna), 1998, pp. 11-13, vol. 30(1). Accession No. 1998:663560 CAPLUS.

Genestar, High Performance Materials, Website http://www.kuraray.co.jp/en/products/products35.html; Visited (Mar. 23, 2004); 1 page.

Arlen, Mitsui Chemicals America, Inc., Website http://www.mitsuichemicals.com/arl.ht; Visited (Mar. 23, 2004); 2 pages.

Table 21-6 U.S. Sieve Series and Tyler Equivalents (ASTM—E-11-61); 1 page, Perry R.H. and Green D.W., "Perry's Chemical Engineers' Handbook", 1984.

* cited by examiner

PELLETIZED BROMINATED ANIONIC STYRENIC POLYMERS AND THEIR PREPARATION AND USE

REFERENCE TO RELATED APPLICATIONS

This application is a division of commonly-owned U.S. application Ser. No. 11/569,070, filed Nov. 14, 2006, now issued as U.S. Pat. No. 7,585,443, which in turn claims the benefit of International Patent Appl. No. PCT/US04/16107, filed on May 20, 2004, the disclosures of which are incorporated herein by reference.

BACKGROUND

Brominated anionic styrenic polymers are excellent flame retardants. Very desirable methods for preparing such polymeric flame retardants are described in U.S. Pat. Nos. 5,677,390; 5,686,538; 5,767,203; 5,852,131; 5,916,978; and 6,207,765.

A characteristic of brominated anionic styrenic polymers such as brominated anionic polystyrene is its propensity to form substantial amounts of small particles and powders when attempts are made to pelletize the product. It appears that upon formation the pellets, unless bound together by an extraneous binding agent or the like, tend to break apart and to revert to small particles and finely-divided powder, typically referred to as "fines". Because of this characteristic, various conventional pelletizing procedures are unsuitable for producing brominated anionic styrenic polymers essentially free of fines. As can be readily appreciated, the existence of fines in a product of this type this is not only detrimental to the appearance of the pelletized product but in addition is undesired by the consumer.

In order to effectively use brominated anionic styrenic polymers as flame retardants in certain thermoplastic polymers, the use of binding agents or other extraneous materials to maintain the integrity of the flame retardant in pelletized form, is also deemed undesirable by the consumer. Thus, there is a need for a way of producing unadulterated pelletized brominated anionic styrenic polymers that do not form undesirable amounts of fines during their preparation and packaging.

BRIEF SUMMARY OF THE INVENTION

Pursuant to this invention brominated anionic styrenic polymers can now be produced and packaged in unadulterated pelletized form essentially free of fines. Moreover preferred embodiments of this invention make this beneficial result possible on an economical basis since only relatively small amounts of fines are produced in the operation. In fact, in preferred processes of this invention small amounts of dry fines that may form can be recycled in the operation without much expense or difficulty.

Thus pursuant to one of its embodiments this invention provides pellets of unadulterated brominated anionic styrenic polymer having a bromine content of at least about 50 wt % and in which at least about 70 wt % (preferably at least about 75 wt %) of the pellets are retained on a standard US No. 40 sieve and no more than about 30 wt % (preferably no more than about 25 wt %) are retained on a standard US No. 5 sieve. In preferred embodiments such pelletized anionic styrenic polymer is brominated anionic polystyrene having a bromine content of at least about 67 wt %, e.g., in the range of about 67 to about 71 wt %. Also preferred are pelletized brominated anionic styrenic polymers in which the melt flow index (ASTM D 1238-99) is at least about 4 g/10 min at 220° C. and 2.16 kg and more preferably is at least about 5 g/10 min at 220° C. and 2.16 kg. If properly handled, the pellets as produced and packaged are substantially free of fines, i.e., particles that pass through a standard US No. 40 sieve.

Another embodiment of this invention is a method of preparing pelletized unadulterated brominated anionic styrenic polymer which method comprises:
A) forming strands of molten unadulterated brominated anionic styrenic polymer;
B) submitting said strands to cooling and downwardly directed forced air flow on a porous conveyor belt whereby said strands are broken into pellets; and
C) causing said pellets to drop into a classifier that removes fines from the pellets.

By the term "unadulterated" is meant that no extraneous ingredients such as binders (e.g., waxes or other polymeric or oligomeric substances), inorganic salts, or the like are added to the brominated anionic styrenic polymer prior to or during the foregoing method of preparing the pellets. Instead, the brominated anionic styrenic polymer contains only residual impurities that remain in the brominated polymer after its preparation.

These and other embodiments of this invention will be still further apparent from the ensuing description, accompanying drawings, and appended claims.

FURTHER DETAILED DESCRIPTION OF THE INVENTION

Brominated Anionic Styrenic Polymer

Figure 1:
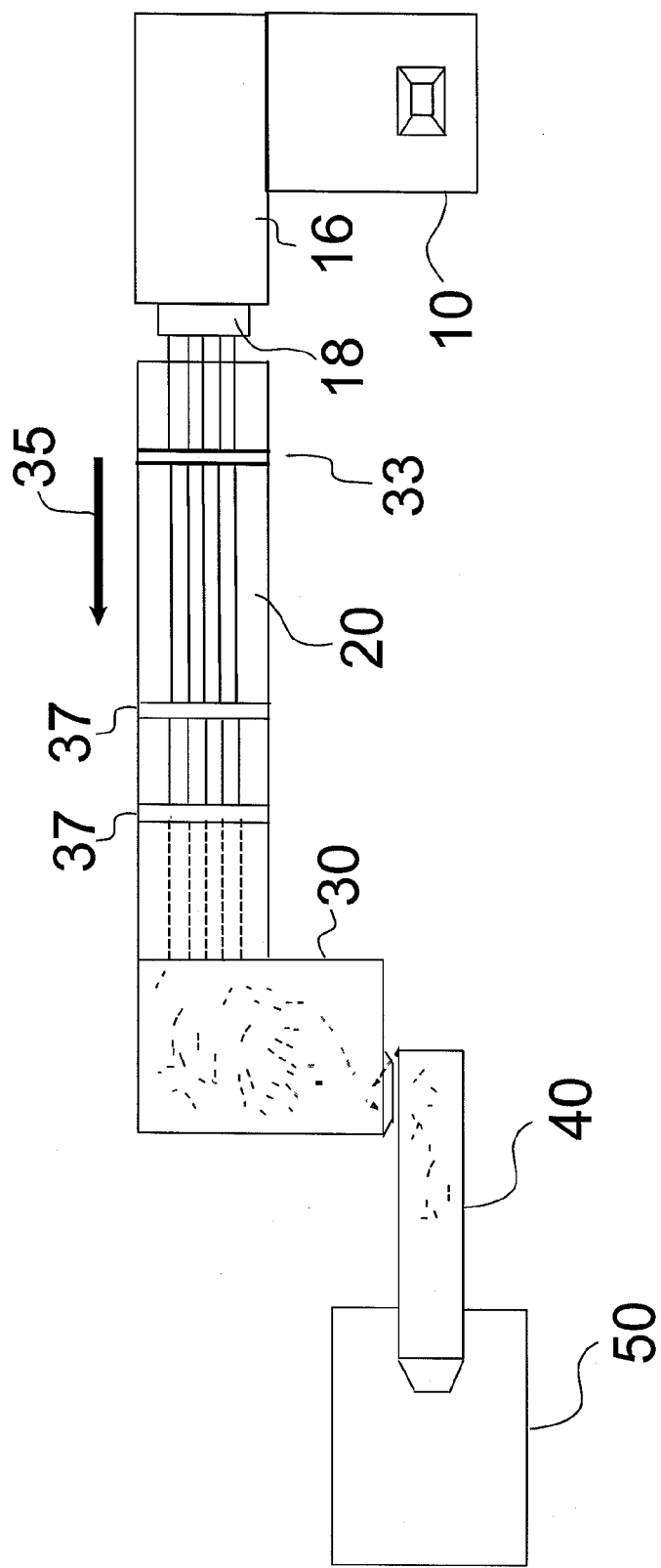
FIG. 1 is a schematic frontal view of a mechanical system found effective in producing pursuant to the methods of this invention, pelletized brominated anionic styrenic polymers of this invention.

The polymers which are converted into pelletized form pursuant to this invention, are one, or a blend of more than one, brominated anionic styrenic polymer, i.e., (i) at least one anionically-produced styrenic homopolymer that has been brominated or (ii) at least one anionically-produced copolymer of two or more styrenic monomers that has been brominated, or (iii) both of (i) and (ii). The bromine content of such polymer should be at least about 50 percent by weight. Preferred brominated anionic styrenic polymers, especially brominated anionic polystyrene, have a bromine content of at least about 60 wt %, and more preferred brominated anionic styrenic polymers, especially brominated anionic polystyrene, have a bromine content of at least about 64 wt %. Particularly preferred brominated anionic styrenic polymers, especially brominated anionic polystyrene, have a bromine content in the range of about 67 to about 69 wt %. The bromine content of brominated anionic styrenic polymers such as brominated anionic polystyrene will seldom exceed about 71 wt %. Typically the brominated anionic styrenic polymer will have a melt flow index by the ASTM D1238-99 test procedure, conducted at 220° C. and 2.16 kg, of at least about 3 g/10 min., preferably at least about 4 g/10 min. and more preferably at least about 5 g/10 min. Typically, such melt flow index will be in the range of about 3 to about 40 g/10 min., and preferably in the range of about 4 to about 35 g/10 min. Most preferred brominated anionic styrenic polymers used in the practice of this invention have a melt flow index under these test conditions in the range of about 5 to about 30 g/10 min. In this connection, these polymers may not "melt" in the sense of reaching a melting point temperature at which they suddenly become transformed from a solid to a liquid. Rather, they tend to be amorphous substances which, when heated, tend to progressively soften as temperature is increased and thus become progressively more pliable and tend to take on characteristics of a liquid such that other substances could be dispersed therewith by use of conventional mixing or blending procedures.

In all embodiments of this invention the most preferred brominated anionic styrenic polymer used in forming the pellets of this invention is unadulterated brominated anionic polystyrene.

Anionic styrenic polymers which are brominated to form the brominated anionic styrenic polymers pelletized pursuant to this invention are one or more anionic homopolymers and/or anionic copolymers of at least one vinyl aromatic monomer. Preferred vinyl aromatic monomers have the formula:

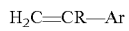

wherein R is a hydrogen atom or an alkyl group having from 1 to 4 carbon atoms and Ar is an aromatic group (including alkyl-ring substituted aromatic groups) of from 6 to 10 carbon atoms. Examples of such monomers are styrene, alpha-methylstyrene, ortho-methylstyrene, meta-methylstyrene, para-methylstyrene, para-ethylstyrene, isopropenyltoluene, vinylnaphthalene, isopropenylnaphthalene, vinylbiphenyl, vinylanthracene, the dimethylstyrenes, and tert-butylstyrene. Polystyrene is the preferred reactant. When the brominated anionic styrenic polymer is made by bromination of an anionic copolymer of two or more vinyl aromatic monomers, it is preferred that styrene be one of the monomers and that styrene comprise at least 50 weight percent and preferably at least about 80 weight percent of the copolymerizable vinyl aromatic monomers. It is to be noted that the terms "brominated anionic styrenic polymer" and "brominated anionic polystyrene" as used herein refer to a brominated anionic polymer produced by bromination of a pre-existing anionic styrenic polymer such as anionic polystyrene or an anionic copolymer of styrene and at least one other vinyl aromatic monomer, as distinguished from an oligomer or polymer produced by oligomerization or polymerization of one or more brominated styrenic monomers, the properties of the latter oligomers or polymers being considerably different from brominated anionic polystyrene in a number of respects. Also, the terms "vinylaromatic" and "styrenic" in connection with monomer(s) or polymer(s) are used interchangeably herein.

The aromatic pendant constituents of the anionic styrenic polymer can be alkyl substituted or substituted by bromine or chlorine atoms, but in most cases, will not be so substituted. Typically, the anionic styrenic polymers used to produce the brominated anionic styrenic polymers used in the practice of this invention will have a weight average molecular weight ($M_w$) in the range of about 2000 to about 50,000 and a polydispersity in the range of 1 to about 10. Preferred brominated anionic styrenic polymers used in the practice of this invention are produced from anionic styrenic polymers having a weight average molecular weight ($M_w$) in the range of about 3000 to about 10,000 and a polydispersity in the range of 1 to about 4, and most preferably these ranges are, respectively, about 3500 to about 4500 and 1 to about 4. The $M_w$ and polydispersity values are both based on gel permeation chromatography (GPC) techniques which are hereinafter described.

Methods for the preparation of anionic styrenic polymers such as anionic polystyrene are known in the art and reported in the literature. See for example, U.S. Pat. Nos. 3,812,088; 4,200,713; 4,442,273; 4,883,846; 5,391,655; 5,717,040; and 5,902,865, the disclosures of which are incorporated herein by reference. An especially preferred method is described in commonly-owned U.S. Pat. No. 6,657,028, issued Dec. 2, 2003, the disclosure of which method is incorporated herein by reference.

Bromination processes which can be used for producing a brominated anionic styrenic polymer are disclosed in U.S. Pat. Nos. 5,677,390; 5,686,538; 5,767,203; 5,852,131; 5,916,978; and 6,207,765 which disclosures are incorporated herein by reference.

Typical properties of preferred brominated anionic polystyrene for use in preparing the pellets of this invention include the following:

Appearance/form—white powder
Bromine Content—67 to 71 wt %
Melt flow index (220° C. 2.16 kg)—4 to 35 g/10 min
Tg (° C.)—162
Specific gravity (@ 23° C.)—2.2
TGA (TA instruments model 2950, 10° C./min. under $N_2$):
    1% weight loss, ° C.—342
    5% weight loss, ° C.—360
    10% weight loss, ° C.—368
    50% weight loss, ° C.—393
    90% weight loss, ° C.—423

If deemed necessary or desirable, any reliable analytical procedure such as reported in the literature can be employed in determining such analysis or properties. In any doubtful or disputed case, the following procedures are recommended:

1) Bromine Content—Since brominated anionic styrenic polymers have good, or at least satisfactory, solubility in solvents such as tetrahydrofuran (THF), the determination of the total bromine content for a brominated anionic styrenic polymer is easily accomplished by using conventional X-Ray Fluorescence techniques. The sample analyzed is a dilute sample, say 0.1±0.05 g brominated anionic polystyrene in 60 mL THF. The XRF spectrometer can be a Phillips PW1480 Spectrometer. A standardized solution of bromobenzene in THF is used as the calibration standard.

2) Melt Flow Index—To determine the melt flow index of a brominated anionic styrenic polymer, the procedure and test equipment of ASTM Test Method D1238-99 are used. The extrusion plastometer is operated at 220° C. and 2.16 kg applied pressure. The samples used in the tests are composed of 14 to 16 g of brominated anionic polystyrene.

3) Weight Average Molecular Weight and Polydispersity— $M_w$ values of anionic styrenic polymers are obtained by GPC using a Waters model 510 HPLC pump and, as detectors, a Waters Refractive Index Detector, Model 410 and a Precision Detector Light Scattering Detector, Model PD2000, or equivalent equipment. The columns are Waters, pStyragel, 500 A, 10,000 A and 100,000 A. The autosampler is a Shimadzu, Model Sil 9A. A polystyrene standard ($M_w$=185,000) is routinely used to verify the accuracy of the light scattering data. The solvent used is tetrahydrofuran, HPLC grade. The test procedure used entails dissolving 0.015-0.020 g of sample in 10 mL of THF. An aliquot of this solution is filtered and 50 μL is injected on the columns. The separation is analyzed using software provided by Precision Detectors for the PD 2000 Light Scattering Detector. The instrument provides results in terms of weight average molecular weight and also in terms of number average molecular weight. Thus, to obtain a value for polydispersity, the value for weight average molecular weight is divided by the value for number average molecular weight.

Production of Pellets

As noted above, the pelletized brominated anionic styrenic polymers of this invention can be prepared by a method which comprises:

A) forming strands of molten unadulterated brominated anionic styrenic polymer;
B) submitting said strands while on a moving porous conveyor belt to cooling and downwardly directed forced air flow whereby at least a portion of said strands are broken into pellets; and
C) causing said pellets to leave said conveyor belt and drop into a classifier that whereby optionally at least some additional breakage into pellets occurs and whereby the classifier removes fines from the pellets that are formed in B) and optionally in C).

In conducting step A) above, various commercially available machines can be successfully used in forming strands of molten or softened brominated anionic styrenic polymer. For example, use can be made of a Buss Ko-Kneader (Coperion GmbH) or a co-rotating intermeshing twin screw extruder such as are available from Coperion GmbH, Berstoff, Century, Leistritz, or JSW Japan Steel Works. The machine is operated at a suitable temperature profile to cause the brominated anionic styrenic polymer to become at least highly softened if not molten. The temperature profile used will thus vary somewhat depending on the makeup of the brominated anionic styrenic polymer being processed. Thus in the case of brominated anionic polystyrene such as SAYTEX® HP 3010 having properties such as described above, a temperature profile of 220-240° C. was found desirable.

In step B), the extrudate from the machine is passed through a die plate and the resultant continuous strands are allowed to drop onto a moving porous conveyor belt. The conveyor belt system is provided with a vacuum equipment beneath the porous bed which continuously draws air down onto the strands on the belt and downwardly through the apertures in the belt itself. Above the conveyor belt are disposed a water spray mechanism for cooling the hot polymer strands and downwardly disposed air blowers which apply sufficient force to the cooling strands which typically causes at least some breakage of the strands to occur on the belt. Surviving unbroken strands, if any, typically undergo at least some breakage as they leave the conveyor belt because of the force of gravity acting upon the unsupported strands emerging from the end of the belt.

In step C), the contents of the belt and any former contents of the conveyor belt that may be emerging from the end of the conveyor belt are caused to drop into a classifier which separates the pellets and the fines from each other. Such droppage onto the classifier may also cause some breakage to occur. The classifier can include, for example, an essentially horizontally disposed mesh which is caused to vibrate back and forth longitudinally. A particularly suitable machine of this type is a Vibratory Classifier such as is available from The Witte Company, Inc.

In a typical operation of step A), the conveyor belt used was about 14 feet (ca. 4.27 meters) in length and was operated at a speed in the range of about 100 to about 200 ft/min (ca. 60.96 meters/min.). The forced air and the water used in the misting of the strands are typically at ambient room temperatures, but can be heated if desired so as to reduce heat shock. The distance of the drop from the end of the conveyor belt to the screen of the classifier was in the range of about 18 to about 36 inches (ca. 45.7 to ca. 91.4 cm).

In a properly conducted pelletizing method of this invention, it should be possible to produce a product in which no more than about 5 wt %, preferably no more than about 3 wt %, and more preferably no more than about 1 wt % are fines or dusts that pass through a standard U.S. No. 40 sieve. Thus, the methods of this invention are highly efficient; only small amounts of such fines are collected and preferably recycled to step A) in the overall pelletizing operation.

Figure 2:
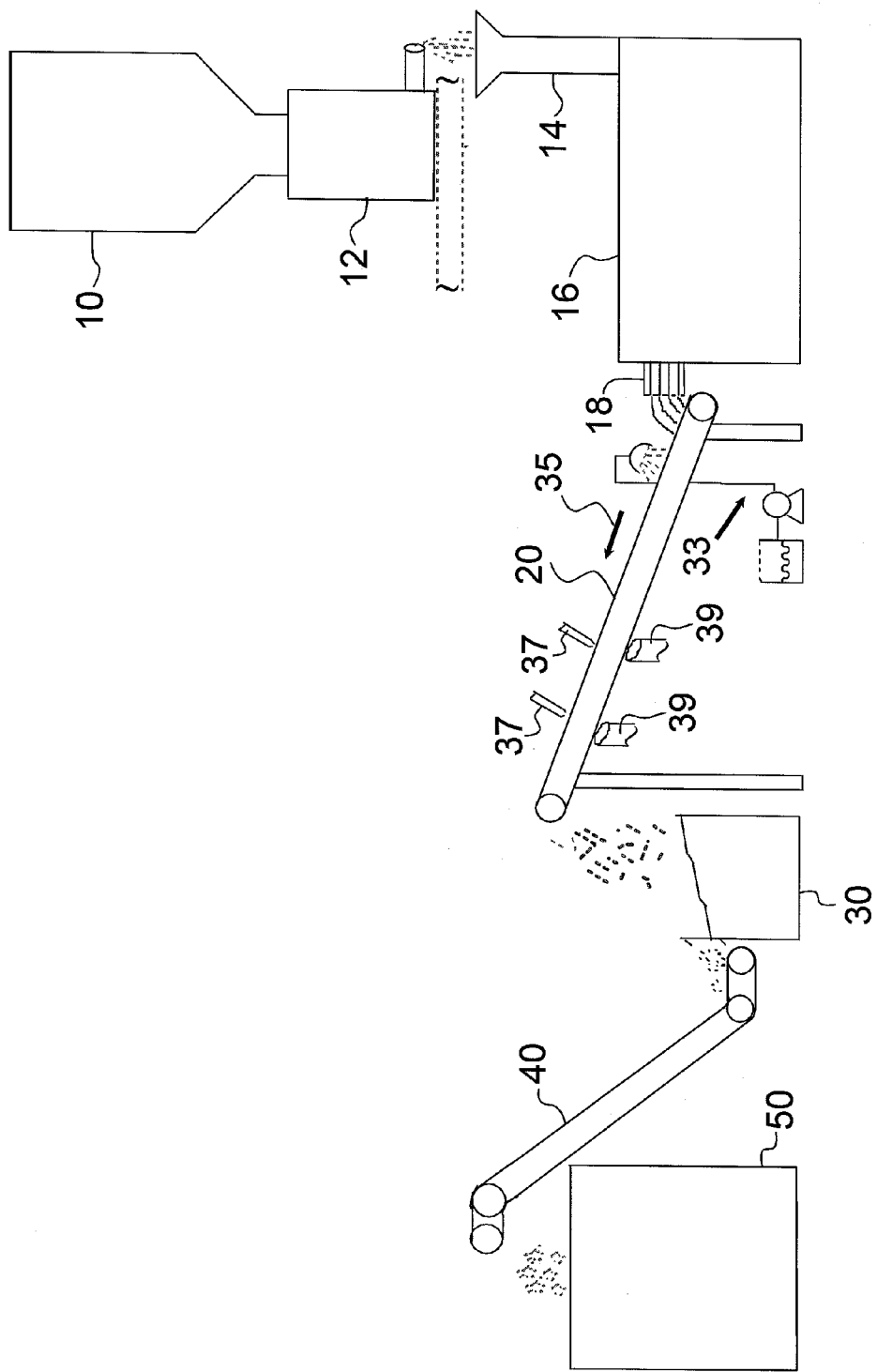
FIG. 2 is a schematic plan view of the system of FIG. 1 with elements 10 and 12 removed for the sake of simplicity.

The foregoing illustrative operations of this invention can be still further appreciated by reference to the drawings. Referring now to the preferred system as schematically depicted in FIGS. 1 and 2 wherein like numerals depict like parts, brominated anionic styrenic polymer in powder form, preferably brominated anionic polystyrene powder having properties such as those of Saytex HP-3010 polymer (Albemarle Corporation) in powder form is fed from hopper 10 into powder feeder 12 and via hopper 14 into kneader 15. From kneader 15 the polymer is directed into crosshead extruder 16. The kneader-extruder combination heats and forms a melt of the brominated anionic styrenic polymer and the melt is discharged through die 18 whereby strands, typically continuous strands, of the polymer are extruded from the die onto moving conveyor belt 20. In the system depicted, belt 20 is upwardly inclined such that the remote end of the upper portion of the belt is typically about 18 to about 36 inches (ca. 45.7 to ca. 91.4 cm) above vibratory classifier 30. Spray system denoted generally as 33 forms and dispenses a mist or spray of water onto the hot polymer strands on the upper portion of belt 20 which is traveling in the direction shown by arrow 35. The cooled strands are then carried by belt 20 under air knives 37,37 which cut or break at least a portion of the strands into pellets. At the underside of belt 20 in proximity to the location of air knives 37,37 are vacuum inlets 39,39 of a conventional vacuum manifold system (not shown) which draws off residual water and fines from the underside of belt 20. The resultant pellets are discharged at the upper outer end of belt 20 and fall under the influence of gravity onto the operative upper surface of classifier 30 which can be a vibratory classifier such as schematically depicted in FIGS. 1 and 2. The impact of the fall can result in formation of addition pellets through breakage of larger pieces falling from belt 20. Thus the pellets in the system depicted in FIGS. 1 and 2 are mainly formed in the region extending from the air knives 37,37 to and including classifier 30. Fines are separated by and collected within classifier 30 which continuously transfers the pellets remaining after the separation onto transfer device 40 such as a segmented conveyor or bucket elevator disposed to receive and convey the pellets forwardly and upwardly to an elevation suitable for feeding the pellets to a suitable heavy duty packaging container 50, such as a Supersack or Gaylord container. A small amount of pellet breakage, which is typically inconsequential, may occur in such packaging step but if this occurs it can be minimized by reduction in the height of the fall from the transfer device to the packaging container.

It will be readily appreciated that the system as depicted in FIGS. 1 and 2 can be suitably altered to achieve formation of pelletized unadulterated brominated anionic styrenic polymer, that is essentially free of fines. For example, a kneader such as a Buss Ko-kneader and associated crosshead extruder can be replaced by a suitable twin screw extruder, such as for example any twin screw or single screw extruder having a length/diameter (L/D) ratio equal to or greater than 20/1. It is also possible to replace the strand die, conveyor, and vibratory classifier with a die-face pelletizer or eccentric pelletizer.

Pellets of the Invention

Pursuant to this invention, pelletized brominated anionic styrenic polymers are produced having as formed and packaged little, if any, fine particles or dusts. Generally speaking the pellets of this invention are composed of unadulterated brominated anionic styrenic polymer having a bromine content of at least about 50 wt % (preferably at least about 60 wt %) and in which at least about 70 wt % (preferably at least about 75 wt %) of the pellets are retained on a standard US No. 40 sieve and no more than about 30 wt % (preferably no more than about 25 wt %) are retained on a standard US No. 5 sieve. In more preferred embodiments the bromine content of the pellets is at least about 64 wt %, and particularly preferred brominated anionic styrenic polymers, have a bromine content in the range of about 67 to about 69 wt %. The bromine content of the pelletized brominated anionic styrenic polymers of this invention such as brominated anionic polystyrene will seldom exceed about 71 wt %, and thus especially preferred are pelletized brominated anionic styrenic polymers of this invention having in the range of about 67 to about 71 wt %. Also preferred are pelletized brominated anionic styrenic polymers in which the melt flow index (ASTM D1238-99) is at least about 4 and preferably is at least about 5.

Especially preferred pellets of this invention are formed from brominated anionic styrenic polymers having a bromine content in the range of about 67 to about 71 wt % and more preferably in the range of about 67 to about 69 wt % bromine, and wherein at least about 80 wt % (more preferably at least about 85 wt %, and most preferably at least about 90 wt %) of the pellets are retained on a standard U.S. No. 40 sieve and no more than about 20 wt % (more preferably no more than about 15 wt % and most preferably no more than about 10 wt %) are retained on a standard U.S. No. 5 sieve. In all cases the preferred brominated anionic styrenic polymer in all of the foregoing pelletized products is brominated anionic polystyrene.

Another characteristic of preferred pellets of this invention is that when poured into a 20 mL cylindrical transparent plastic capped bottle, the interior walls of the bottle remain essentially free of any visibly perceptible dust or powder.

Use of the Pellets as Flame Retardants

The pellets of this invention can be used as flame retardants in a wide variety of thermoplastic polymers. Among such polymers are thermoplastic polyesters, such as polyethylene terephthalate, polybutylene terephthalate, polytrimethylene terephthalate, polycyclohexylene terephthalate, etc.; thermoplastic polyamides, such as nylon 6, nylon 6,6, nylon 6,12, etc.; polycarbonates; polyphenylene oxides, such as poly(2, 6-dimethylphenylene oxide); polysulphones; polystyrene or other styrenic homopolymers; copolymers of two or more styrenic monomers such as copolymers of styrene, vinyltoluene, ethylstyrene, tert-butylstyrene, α-mEthylstyrene, vinylnaphthalene, etc.; rubber-modified vinylaromatic homopolymers or copolymers (e.g., high impact polystyrene); acrylate or methacrylate polymers such as ethylene-methylacrylate, ethylene-ethylacrylate, ethylene-butylacrylate, poly(methylmethacrylate), etc.; ethylene-vinylacetate copolymers; acrylonitrile-based copolymers and terpolymers such as acrylonitrile-butadiene-styrene (ABS) and styrene-acrylonitrile (SAN), etc.; polyolefins, such as polyethylene, polypropylene, poly-(1-butene), and copolymers of ethylene with one or more higher vinyl olefins such as propylene, 1-butene, 1-pentene, 1-hexene, 1-heptene, 1-octene; and blends, alloys, or composites of different polymers such as for example a blend of poly(2,6-dimethylphenylene oxide) and polystyrene, a blend of polycarbonate and polystyrene, and similar blends. Additional polymers that can be flame retarded by use therewith of pelletized flame retardant additives of this invention include rubbery block copolymers such as styrene-ethylene-ethylene-styrene, styrene-ethylene-propylene-styrene, styrene-ethylene-butylene-styrene, etc.; polyurethanes; epoxy resins; phenolic resins; elastomers such as natural rubber, butyl rubber, GRS, GRN, EPDM, etc; polysiloxanes; and the like. Further, the polymer may be, where appropriate, crosslinked by chemical means or by radiation. A large number of flame retardant-free polymers suitable for use in the practice of this invention can be obtained from a number of commercial sources.

A preferred group of substrate polymers that can be effectively flame retarded by use of the pellets of this invention are polyesters. Thermoplastic polyesters, often referred to as polyalkylene terephthalates, are reaction products of aromatic dicarboxylic acid or reactive derivatives thereof, such as methyl esters or anhydrides, and aliphatic, cycloaliphatic, or araliphatic diols, and mixtures of such reaction products. Examples of such thermoplastic polyesters include polyethylene terephthalate, polypropylene terephthalate, polybutylene terephthalate, polycyclohexylene dimethylene terephthalate, and related copolyesters and blends, including blends of one or more thermoplastic polyesters with one or more other thermoplastic polymers such as polycarbonates, and especially aromatic polycarbonates.

Preferred thermoplastic polyesters contain at least 80% by weight and preferably at least 90% by weight, based on the dicarboxylic acid component, of terephthalic acid and at least 80% by weight and preferably at least 90% by weight, based on the diol component, of ethylene glycol and/or 1,4-butanediol units.

In addition to terephthalic acid units, the preferred thermoplastic polyesters may contain up to 20 mole % and preferably up to 10 mole % of units of other aromatic or cycloaliphatic $C_{8-14}$ dicarboxylic acids or aliphatic $C_{4-12}$ dicarboxylic acids, such as, for example, units of phthalic acid, isophthalic acid, 2,6-naphthalene dicarboxylic acid, 4,4'-diphenyl dicarboxylic acid, succinic acid, adipic acid, sebacic acid, azelaic acid, or cyclohexane diacetic acid.

In addition to ethylene glycol and 1,4-butanediol units, the preferred thermoplastic polyesters may contain up to 20 mole % and preferably up to 10 mole % of other aliphatic $C_{3-12}$ diols or cycloaliphatic $C_{6-12}$ diols, such as, for example, units of 1,3-propanediol, 2-ethylpropane-1,3-diol, neopentyl glycol, 1,5-pentanediol, 1,6-hexanediol, 1,4-cyclohexanedimethanol, 3-ethylpentane-2,4-diol, 2-methylpentane-2,4-diol, 2,2,3-trimethylpentane-1,3-diol, 2-ethylhexane-1,3-diol, 2,2-diethylpropane-1,3-diol, 2,5-hexanediol, 2,2-bis(4-hydroxy-cyclohexyl)propane, 2,4-dihydroxy-1,1,3,3-tetramethylcyclobutane, 2,2-bis[4-(2-hydroxy-ethoxy) phenyl]propane, or 2,2-bis-[4-hydroxypropoxy)phenyl] propane.

Polyalkylene terephthalates may be branched by incorporation of relatively small quantities of trihydric or tetrahydric alcohols or tribasic or tetrabasic carboxylic acids. In this connection see, for example, U.S. Pat. No. 3,692,744. Examples of preferred branching agents are trimesic acid, trimellitic acid, trimethylol ethane and propane and pentaerythritol.

Particularly preferred thermoplastic polyesters are those produced solely from terephthalic acid or a reactive derivative thereof such as a dialkyl ester, and ethylene glycol and/or 1,4-butane diol, and mixtures of these polyalkylene terephthalates. Preferred polyalkylene terephthalate mixtures contain 1 to 50% by weight of polyethylene terephthalate and 99 to 50 wt % of polybutylene terephthalate. Particularly preferred mixtures contain 1 to 30 wt % of polyethylene terephthalate and 99 to 70% by weight of polybutylene terephthalate.

The polyalkylene terephthalates preferably used generally have an intrinsic viscosity of 0.4 to 1.5 dl/g, preferably 0.5 to 1.3 dl/g and more preferably 0.55 to 1.2 dl/g, as measured in phenol/o-dichlorobenzene (1:1 parts by weight) at 25° C. using an Ubbelohde viscosimeter. Polyethylene terephthalate and polybutylene terephthalate of these intrinsic viscosity ranges, and mixtures thereof, are most preferred. As is well known, polyethylene terephthalate engineering resin producers compound their products from either virgin PET (typically 0.55-0.70 IV) or reclaimed PET from industrial scrap, polyester film scrap, bottles and, rarely polyester fiber scrap.

Additional thermoplastic polyesters which may be utilized in the practice of this invention include, for example, polyetheresters, polyester-polycarbonate blends or alloys, polyester-ABS blends or alloys, polyester-MBS blends or alloys, and impact-modified thermoplastic polyesters.

Polyalkylene terephthalates may be produced by known methods. See, for example, *Encyclopedia of Polymer Science and Technology*, Vol. 11, pages 62-128, John Wiley & Sons, Inc., copyright 1969; and Kirk-Othmer, *Encyclopedia of Chemical Technology*, 4th Ed., Vol. 19, pages 609-653, John Wiley & Sons, Inc., copyright 1996.

Another group of preferred thermoplastic polymers which can be effectively flame retarded by use of the pellets of this invention are polyamides, which are sometimes referred to as nylon polymers. Such polyamide substrate polymer can be any amorphous and/or partly crystalline, predominately aliphatic/cycloaliphatic or partially aromatic thermoplastic polyamide. Typically such materials are produced by polycondensation and/or polymerization processes from diamines which are predominately or entirely aliphatic or cycloaliphatic in structure, or which are partially or entirely aromatic in structure, and carboxylic acids or lactams which are predominantly or entirely aliphatic or cycloaliphatic in structure, or which are partially or entirely aromatic in structure. Typical amines used in forming polyamides include such diamines as hexamethylenediamine, tetramethylenediamine, 2,2,4- and 2,4,4-trimethyl-hexamethylenediamine, diaminodicyclohexylmethane (isomers), diaminodicyclohexylpropane (isomers) and isophoronediamine (isomers), and xylylenediamine. Also used as source materials are aminocarboxylic acids such as ε-aminocaproic acid, or ω-aminocarboxylic acids such as ω-aminolauric acid and ω-aminoundecanoic acid. Typically, the carboxylic acid used are aliphatic or mixed aliphatic-aromatic dicarboxylic acids having less than 50% by weight aromatic constituents such as adipic acid, 2,2,4- and 2,4,4-trimethyladipic acid, azelaic acid, sebacic acid, decanedicarboxylic acid, dodecanedicarboxylic acid, cyclohexanedicarboxylic acid, hexahydroterephthalic acid, isophthalic acid and terephthalic acid.

Copolyamides from the majority of the known monomers can also be used.

Illustrative polyamides which may be used in the practice of this invention are such polyamides as nylon 6, nylon 6,6, nylon 6,9, nylon 6,10, nylon 6,12, nylon 11, nylon 12, nylon 12,12, nylon 6/6,6 copolymer, and high temperature nylons such as nylon 4,6, and partially aromatic nylons (e.g., Ixef polyarylamide PA MXD6 from Solvay, Zytel HTN from DuPont, and Amodel polyarylamide from Solvay). Other polyamides which may be used include Arlen modified polyamide 6T from Mitsui Chemicals, Inc., Genestar PA9T polyamide resis from Kuraray Company, Stanyl polyamide 46 from DSM, Vydyne polyamide 6/66 copolymers from Monsanto, polyamide 612 (Vestamid D from Creanova), and similar polyamides. Of the various nylon polymers, nylon 6 and nylon 6,6 are the preferred substrate polymers.

This invention is also applicable to thermoplastic blends or alloys of one or more polyamides such as, for example, polyamide-polyolefin blends or alloys, polyamide-ionomer blends or alloys, polyamide-ABS blends or alloys, polyamide-EPDM blends or alloys, polyamide-polyphenylene oxide blends or alloys, or impact-modified polyamides.

Methods for producing polyamide polymers are known and described in the literature. See, for example, *Encyclopedia of Polymer Science and Technology*, Vol. 10, pages 460-482, John Wiley & Sons, Inc., copyright 1969; and Kirk-Othmer, *Encyclopedia of Chemical Technology*, 4th Ed., Vol. 19, pages 559-584, John Wiley & Sons, Inc., copyright 1996.

The following examples illustrate the practice and advantages of this invention. These examples are not intended to place limitations upon the generic scope of this invention.

EXAMPLE 1

The excellent results achievable pursuant to this invention, were demonstrated in an operation in which a system as schematically depicted in FIGS. 1 and 2 was used, In such system, the following equipment was used:

a) The extruder system was a 140 mm Buss Ko-kneader 15 having an L/D of 11/1 (but which can be 7.1 or greater) fitted with crosshead extruder 16. The screw profile of the kneader contained kneading elements.

b) Die 18 was a 20-hole die with holes of 4 mm diameter.

c) Conveyor belt 20 was a Scheer-Bay conveyor having a length of 14 feet (ca. 4.3 meters), a width of 15 inches (ca. 38.1 cm), and 3-inch (ca. 7.6-centimeter) diameter rollers. The mesh belt was upwardly inclined at an angle of about 12°.

d) Classifier 30 was a Witte model no 200 Classifier.

The vertical distance between the drop from the end of belt 20 to the top of classifier 30 was about 24 inches (ca. 61 cm), and the vertical distance between the end of transfer device 40 and the bottom of shipping container 50 when empty was about 60 inches (ca. 152 cm).

The operating conditions in the system were as follows:

The extruder system was operated at barrel and melt temperatures of 220-240° C. During operation, a vacuum of 6-8 inches of mercury (ca. 0.21-0.28 kg/sq cm) was applied to both the kneader and the crosshead extruder. The conveyor traveled at a rate of 150 to 175 ft/min (ca. 45.7 to ca. 53.3 meters/minute). The water mist was fed at a rate of about 1 gallon per minute (ca. 3.79 liters per minute). The air knives were operated at a pressure of 10-25 psig and were disposed at about 5 inches (ca. 12.7 cm) above the surface of the conveyor belt. The vacuum applied beneath the conveyor belt was at about 2200 cubic feet per minute (ca. 62.3 cubic meters per minute) and the vacuum was applied directly to the proximate surface of the conveyor belt by two vacuum applicators disposed transverse to the belt with the mouth of each individual applicator having an area of 45 square inches (ca. 114.3 square centimeters).

During an operating period of 4 hours periodically samples of the brominated anionic polystyrene pellets being produced were withdrawn from the system and subjected to sieving and in some cases to melt index determinations. In the sieving operation 100 gram samples were placed on a stack of 3 members, the top being a standard U.S. No. 5 sieve, the next lower member being a standard U.S. No. 40 sieve, and the bottom member being a collection pan for fines. After the samples were placed on the upper sieve, the entire stack was struck 10 times by hand with as uniform a force as possible.

Then the contents of the 3 members were weighed thereby yielding values for wt % of pellets retained on the No. 5 sieve, on the No. 40 sieve, and in the collection pan for fines.

In the melt flow determinations, samples of the pellets were used in the standardized procedure.

Table 1 summarizes the data obtained in this operation.

TABLE 1

| Sample No. | % Volatiles | Melt Flow Index | % Retained on No. 5 Sieve | % Retained on No. 40 Sieve | % Fines Passing Through No. 40 Sieve |
|---|---|---|---|---|---|
| 1 | 0.04 | 5.6 | 8.5 | 91.2 | 0.4 |
| 2 | 0.04 | — | 8.3 | 91.5 | 0.2 |
| 3 | 0.04 | 7.4 | 19.4 | 80.2 | 0.4 |
| 4 | 0.03 | — | 20.3 | 79.1 | 0.6 |
| 5 | 0.04 | — | 12.0 | 87.6 | 0.3 |
| 6 | 0.04 | 7.5 | 4.4 | 94.3 | 1.3 |
| 7 | 0.04 | — | 12.1 | 87.5 | 0.3 |

EXAMPLE 2

The same equipment, operating conditions, and sample evaluation as in Example 1 were used except that the Buss Ko-kneader and the crosshead extruder were replaced by a 90 mm twin screw compounding extruder which is a co-rotating intermeshing twin screw extruder Model no. ZSK-90 manufactured by Werner Pfleiderer. This extruder was operated at a rate of 1200 lbs/hr (ca. 543 kilograms/hour) with a temperature profile of 220-240° C. In this operation the samples were taken periodically during an operation period of 4 hours. Table 2 summarizes the results of this operation.

TABLE 2

| Sample No. | % Volatiles | Melt Flow Index | % Retained on No. 5 Sieve | % Retained on No. 40 Sieve | % Fines Passing Through No. 40 Sieve |
|---|---|---|---|---|---|
| 1 | 0.27 | 5.6 | 4.1 | 95.9 | 0.0 |
| 2 | 0.19 | — | 3.1 | 96.3 | 0.6 |
| 3 | 0.04 | 6.9 | 2.7 | 96.9 | 0.4 |
| 4 | 0.08 | — | 3.5 | 96.0 | 0.4 |
| 5 | 0.07 | — | 6.7 | 92.4 | 0.9 |
| 6 | 0.04 | 7.0 | 2.7 | 97.1 | 0.2 |
| 7 | — | — | 4.4 | 95.2 | 0.3 |
| 8 | 0.04 | 8.6 | 8.3 | 91.3 | 0.3 |
| 9 | — | — | 4.8 | 94.1 | 1.1 |
| 10 | 0.04 | — | 4.2 | 95.2 | 0.7 |
| 11 | 0.06 | 6.3 | 1.6 | 98.0 | 0.4 |
| 12 | 0.04 | — | 3.2 | 96.4 | 0.4 |
| 13 | 0.04 | 6.9 | 1.7 | 98.0 | 0.3 |
| 14 | 0.04 | — | 4.9 | 95.1 | 0.0 |
| 15 | 0.06 | — | 3.4 | 95.4 | 0.0 |
| 16 | 0.06 | 7.4 | 2.2 | 97.1 | 0.7 |
| 17 | 0.04 | — | 3.2 | 96.4 | 1.0 |
| 18 | 0.08 | 7.0 | 0.7 | 97.4 | 1.9 |
| 19 | 0.04 | — | 0.5 | 98.9 | 0.6 |
| 20 | 0.04 | — | 4.1 | 95.5 | 0.4 |
| 21 | 0.04 | 5.4 | 4.5 | 95.3 | 0.2 |
| 22 | 0.08 | — | 4.2 | 95.4 | 0.4 |
| 23 | 0.07 | 5.3 | 1.6 | 95.8 | 2.6 |
| 24 | 0.07 | — | 1.3 | 97.9 | 0.8 |
| 25 | 0.08 | — | 2.6 | 95.9 | 1.5 |
| 26 | 0.06 | 7.7 | 6.1 | 93.6 | 0.5 |
| 27 | 0.04 | — | 4.3 | 95.4 | 0.3 |
| 28 | 0.04 | 5.6 | 2.8 | 97.0 | 0.3 |
| 29 | 0.04 | — | 2.9 | 96.4 | 0.7 |
| 30 | 0.04 | — | 1.8 | 96.2 | 2.1 |
| 31 | 0.04 | 4.9 | 2.3 | 96.0 | 1.7 |
| 32 | 0.04 | — | 1.7 | 96.8 | 1.5 |
| 33 | 0.04 | 5.4 | 2.0 | 97.4 | 0.6 |
| 34 | 0.04 | — | 2.0 | 96.7 | 1.4 |
| 35 | 0.08 | — | 1.8 | 96.9 | 1.3 |
| 36 | 0.08 | 5.8 | 2.7 | 95.8 | 1.5 |
| 37 | 0.04 | 5.8 | 2.6 | 97.0 | 0.4 |
| 38 | 0.04 | — | 4.4 | 95.0 | 0.6 |
| 39 | 0.04 | 5.2 | 4.1 | 95.7 | 0.3 |
| 40 | 0.04 | — | 4.5 | 95.2 | 0.3 |
| 41 | 0.02 | — | 2.2 | 97.4 | 0.4 |
| 42 | 0.04 | 5.5 | 5.2 | 94.7 | 0.1 |
| 43 | 0.04 | — | 7.1 | 92.4 | 0.2 |
| 44 | 0.04 | 5.4 | 6.5 | 93.0 | 0.4 |
| 45 | 0.04 | — | 5.3 | 94.6 | 0.2 |
| 46 | 0.04 | — | 1.7 | 97.9 | 0.4 |
| 47 | 0.04 | 5.2 | 6.5 | 92.8 | 0.8 |
| 48 | 0.04 | — | 4.6 | 94.8 | 0.6 |
| 49 | 0.04 | 9.0 | 2.6 | 96.4 | 1.0 |
| 50 | 0.06 | — | 2.2 | 96.8 | 1.0 |
| 51 | 0.04 | — | 5.3 | 94.5 | 0.2 |
| 52 | 0.04 | 5.7 | 7.7 | 92.2 | 0.1 |
| 53 | 0.04 | — | 6.6 | 93.2 | 0.2 |
| 54 | 0.04 | 7.7 | 4.6 | 95.4 | 0.0 |
| 55 | 0.07 | — | 2.5 | 97.0 | 0.5 |
| 56 | 0.06 | — | 2.4 | 96.9 | 0.7 |
| 57 | 0.04 | 9.2 | 4.0 | 93.9 | 2.2 |
| 58 | 0.04 | — | 7.6 | 92.1 | 0.3 |
| 59 | 0.04 | 4.6 | 5.9 | 93.3 | 0.8 |
| 60 | 0.04 | — | 6.3 | 93.5 | 0.2 |
| 61 | 0.06 | — | 5.5 | 93.5 | 1.0 |
| 62 | 0.04 | 7.8 | 6.6 | 93.2 | 0.3 |
| 63 | 0.07 | — | 6.7 | 93.1 | 0.2 |
| 64 | 0.04 | 5.7 | 3.6 | 95.8 | 0.6 |
| 65 | 0.04 | — | 3.8 | 95.4 | 0.8 |
| 66 | 0.04 | — | 2.9 | 96.2 | 0.9 |
| 67 | 0.04 | 5.4 | 3.3 | 96.1 | 0.5 |
| 68 | 0.04 | — | 1.7 | 98.1 | 0.2 |
| 69 | 0.04 | 6.1 | 2.6 | 97.0 | 0.5 |
| 70 | 0.04 | — | 5.5 | 94.1 | 0.5 |
| 71 | 0.04 | — | 4.2 | 95.6 | 0.2 |
| 72 | 0.03 | — | 10.3 | 88.7 | 1.0 |
| 73 | 0.04 | — | 7.0 | 92.7 | 0.3 |
| 74 | 0.00 | 5.2 | 6.0 | 93.9 | 0.1 |
| 75 | 0.04 | — | 5.9 | 93.2 | 0.8 |
| 76 | 0.04 | — | 3.5 | 95.9 | 0.6 |
| 77 | 0.04 | 5.8 | 5.2 | 93.3 | 1.5 |
| 78 | 0.06 | — | 5.1 | 94.7 | 0.2 |
| 79 | 0.11 | 6.8 | 5.1 | 94.6 | 0.2 |
| 80 | 0.06 | — | 5.2 | 94.4 | 0.4 |
| 81 | 0.06 | — | 4.2 | 94.9 | 0.9 |
| 82 | 0.04 | 5.8 | 3.3 | 96.0 | 0.7 |
| 83 | 0.04 | — | 11.5 | 88.3 | 0.3 |
| 84 | 0.04 | 6.2 | 7.2 | 90.8 | 0.1 |
| 85 | 0.04 | — | 8.9 | 90.7 | 0.4 |
| 86 | 0.00 | — | 8.5 | 91.0 | 0.5 |
| 87 | 0.00 | 7.2 | 15.0 | 84.8 | 0.2 |
| 88 | 0.06 | — | 11.0 | 88.7 | 0.2 |
| 89 | 0.04 | 6.9 | 9.1 | 90.8 | 0.1 |
| 90 | 0.04 | — | 6.7 | 93.2 | 0.1 |
| 91 | 0.04 | — | 8.4 | 91.3 | 0.3 |
| 92 | 0.04 | 6.2 | 7.3 | 92.6 | 0.1 |
| 93 | 0.04 | — | — | — | — |
| 94 | 0.04 | 6.0 | 9.0 | 90.8 | 0.2 |
| 95 | 0.06 | — | 3.3 | 96.3 | 0.4 |
| 96 | 0.04 | — | 8.4 | 91.4 | 0.2 |
| 97 | 0.04 | 6.1 | 3.6 | 96.0 | 0.4 |
| 98 | 0.04 | — | 2.9 | 97.0 | 0.1 |
| 99 | 0.04 | 5.8 | 4.2 | 95.4 | 0.4 |
| 100 | 0.04 | — | 7.9 | 91.8 | 0.3 |
| 101 | 0.04 | — | 8.0 | 91.8 | 0.2 |
| 102 | 0.04 | 7.3 | 5.3 | 94.4 | 0.3 |
| 103 | 0.04 | — | 9.0 | 90.6 | 0.4 |
| 104 | 0.04 | 6.2 | 3.7 | 96.0 | 0.4 |
| 105 | 0.03 | — | 4.1 | 95.0 | 0.9 |
| 106 | 0.04 | — | 8.6 | 91.1 | 0.3 |
| 107 | 0.04 | 6.0 | 8.2 | 91.4 | 0.4 |
| 108 | 0.00 | — | 6.1 | 93.7 | 0.2 |
| 109 | 0.04 | — | 6.9 | 92.9 | 0.2 |
| 110 | 0.04 | — | 5.4 | 94.6 | 0.0 |
| 111 | 0.04 | — | 5.4 | 94.2 | 0.4 |

TABLE 2-continued

| Sample No. | % Volatiles | Melt Flow Index | % Retained on No. 5 Sieve | % Retained on No. 40 Sieve | % Fines Passing Through No. 40 Sieve |
|---|---|---|---|---|---|
| 112 | 0.06 | 6.3 | 7.1 | 92.8 | 0.2 |
| 113 | 0.04 | — | 3.4 | 96.2 | 0.5 |
| 114 | 0.04 | — | 8.9 | 90.5 | 0.6 |
| 115 | 0.04 | — | 7.9 | 91.5 | 0.6 |
| 116 | 0.03 | — | 6.7 | 92.3 | 1.0 |
| 117 | 0.04 | 6.3 | 9.8 | 90.0 | 0.2 |
| 118 | 0.04 | — | 11.4 | 88.2 | 0.4 |
| 119 | 0.04 | 6.1 | 8.7 | 90.9 | 0.4 |
| 120 | 0.04 | — | 8.1 | 91.5 | 0.4 |
| 121 | 0.03 | — | 10.3 | 89.5 | 0.2 |
| 122 | 0.04 | 6.2 | 7.4 | 92.2 | 0.4 |
| 123 | 0.04 | — | 7.8 | 91.8 | 0.5 |
| 124 | 0.04 | 5.9 | 7.5 | 92.2 | 0.3 |
| 125 | 0.04 | — | 9.1 | 90.8 | 0.1 |
| 126 | 0.10 | — | 3.2 | 96.6 | 0.2 |
| 127 | 0.04 | 5.9 | 4.0 | 95.4 | 0.6 |
| 128 | 0.04 | — | 12.8 | 85.5 | 1.8 |
| 129 | 0.00 | 5.6 | 5.8 | 93.5 | 0.6 |
| 130 | 0.00 | — | 7.9 | 91.7 | 0.4 |
| 131 | 0.00 | — | 8.9 | 90.4 | 0.7 |
| 132 | 0.04 | 5.2 | 7.2 | 92.6 | 0.2 |
| 133 | 0.04 | — | 7.0 | 92.5 | 0.5 |
| 134 | 0.04 | 6.6 | 7.0 | 92.6 | 0.4 |
| 135 | 0.04 | — | 8.9 | 90.7 | 0.4 |
| 136 | 0.04 | — | 5.0 | 94.2 | 0.8 |
| 137 | 0.04 | 7.7 | 4.5 | 93.7 | 1.9 |

Within 3 sigma statistical limits, the results tabulated in Tables 1 and 2 relative to percentages retained on No. 5 and No. 40 sieves show that for the No. 5 sieve the percentage retained is between 0 and 16 wt %, whereas 83-100 wt % were retained on the No. 40 sieve. On the same statistical basis, from 0-2 wt % of fines would pass through the No. 40 sieve. Thus, the process was found statistically to provide yields of desired products in the range of 98 to 100%. Except as may be expressly otherwise indicated, the article "a" or "an" if and as used herein is not intended to limit, and should not be construed as limiting the description to a single element to which the article refers. Rather, the article "a" or "an" if and as used herein is intended to cover one or more such elements, unless the text expressly indicates otherwise.

Each and every patent or publication referred to in any portion of this specification is incorporated into this disclosure by reference, as if set forth herein.

This invention is susceptible to considerable variation within the spirit and scope of the appended claims. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

The invention claimed is:

1. Pellets of unadulterated brominated anionic styrenic polymer having (i) a bromine content of at least about 50 wt % and (ii) a melt flow index, measured at 220° C. under a load of 2.16 kg, of at least 4.5 g/10 min, said pellets being further characterized in that (iii) no more than about 5 wt % of the pellets as formed and packaged are fines or dusts that pass through a standard US No. 40 sieve and (iv) at least about 70 wt % of the pellets are retained on a standard US No. 40 sieve and no more than about 30 wt % are retained on a standard US No. 5 sieve.

2. Pellets as in claim 1 wherein said bromine content is at least about 60 wt %.

3. Pellets as in claim 1 wherein said bromine content is at least about 64 wt %.

4. Pellets as in claim 1 wherein said bromine content is in the range of about 67 to about 71 wt %.

5. Pellets as in claim 1 wherein said bromine content is in the range of about 67 to about 69 wt %.

6. Pellets as in claim 1 wherein said melt flow index, measured at 220° C. under a load of 2.16 kg, is at least 5.5 g/10 min.

7. Pellets as in claim 1 or 4 wherein at least about 75 wt % of the pellets are retained on a standard US No. 40 sieve and no more than about 25 wt % are retained on a standard US No. 5 sieve.

8. Pellets as claim 1 or 4 wherein at least about 80 wt % of the pellets are retained on a standard US No. 40 sieve and no more than about 20 wt % are retained on a standard US No. 5 sieve.

9. Pellets as in claim 1 or 4 wherein at least about 85 wt % of the pellets are retained on a standard US No. 40 sieve and no more than about 15 wt % are retained on a standard US No. 5 sieve.

10. Pellets as in claim 1 or 4 wherein at least about 90 wt % of the pellets are retained on a standard US No. 40 sieve and no more than about 10 wt % are retained on a standard US No. 5 sieve.

11. Pellets as in claim 1 or 4 wherein at least about 75 wt % of the pellets are retained on a standard US No. 40 sieve and no more than about 25 wt % are retained on a standard US No. 5 sieve, and wherein said pellets have a melt flow index, measured at 220° C. under a load of 2.16 kg, of at least 5.5 g/10 min, said pellets being further characterized in that no more than about 3 wt % of the pellets as formed and packaged are fines or dusts that pass through a standard US No. 40 sieve.

12. Pellets as in claim 1 or 4 wherein at least about 80 wt % of the pellets are retained on a standard US No. 40 sieve and no more than about 20 wt % are retained on a standard US No. 5 sieve, and wherein said pellets have a melt flow index, measured at 220° C. under a load of 2.16 kg, of at least 5.5 g/10 min, said pellets being further characterized in that no more than about 3 wt % of the pellets as formed and packaged are fines or dusts that pass through a standard US No. 40 sieve.

13. Pellets as in claim 1 or 4 wherein at least about 85 wt % of the pellets are retained on a standard US No. 40 sieve and no more than about 15 wt % are retained on a standard US No. 5 sieve, and wherein said pellets have a melt flow index, measured at 220° C. under a load of 2.16 kg, of at least 5.5 g/10 min, said pellets being further characterized in that no more than about 3 wt % of the pellets as formed and packaged are fines or dusts that pass through a standard US No. 40 sieve.

14. Pellets as in claim 1 or 4 wherein at least about 90 wt % of the pellets are retained on a standard US No. 40 sieve and no more than about 10 wt % are retained on a standard US No. 5 sieve, and wherein said pellets have a melt flow index, measured at 220° C. under a load of 2.16 kg, of at least 5.5 g/10 min, said pellets being further characterized in that no more than about 3 wt % of the pellets as formed and packaged are fines or dusts that pass through a standard US No. 40 sieve.

15. Pellets as in claim 1 wherein said unadulterated brominated anionic styrenic polymer is unadulterated brominated anionic polystyrene having a bromine content in the range of about 67 to about 71 wt %, wherein said polystyrene has a melt flow index, measured at 220° C. under a load of 2.16 kg, of at least 4.5 g/10 min and wherein said pellets are further characterized in that no more than about 3 wt % of the pellets as formed and packaged are fines or dusts that pass through a standard US No. 40 sieve.

16. Pellets as in claim 15 wherein at least about 80 wt % of the pellets are retained on a standard US No. 40 sieve and no more than about 20 wt % are retained on a standard US No. 5 sieve, wherein said bromine content is at least about 60 wt % and wherein said pellets are further characterized in that no more than about 1 wt % of the pellets as formed and packaged are fines or dusts that pass through a standard US No. 40 sieve.

17. Pellets as in claim 15 wherein at least about 90 wt % of the pellets are retained on a standard US No. 40 sieve and no more than about 10 wt % are retained on a standard US No. 5 sieve, wherein said bromine content is in the range of about 67 to about 69 wt % and wherein said pellets are further characterized in that no more than about 3 wt % of the pellets as formed and packaged are fines or dusts that pass through a standard US No. 40 sieve.

* * * * *